United States Patent Office 3,469,995
Patented Sept. 30, 1969

3,469,995
MEAT ADDITIVES
David Jacoby, Los Angeles, and Rosalynne J. Berhold, Santa Monica, Calif., assignors to Adolph's Food Products Mfg. Co., Burbank, Calif., a corporation of California
No Drawing. Filed Dec. 23, 1965, Ser. No. 516,135
Int. Cl. A22c 11/00
U.S. Cl. 99—108                    5 Claims

ABSTRACT OF THE DISCLOSURE

Improvement in meat additives for the retention of moisture, reduction in shrinkage, and improvement in texture of ground and diced meats by the addition of one or more than one of the following ingredients, to wit: unmodified starches containing 50% or more of amylopectin, a chelating agent, and a protease, or combinations thereof.

---

This invention relates to compositions of matter for the improvement of the properties of ground or diced meats such as hamburger and similar meat products.

The major problem in producing cooked meat products, especially sauteed or broiled hamburgers and roasted or baked meats such as meat loaf, is the common result that the cooked product may be crumbly, dried out, i.e., of reduced juiciness, and show excessive shrinkage, inferior chewiness and a rubbery texture. Cooking by frying or broiling causes a coagulation of the proteins and alters the cellular structure of the meat, causing shrinkage both by evaporation of the water and also by the drainage of liquids, fats and other nutrients. The consistency of hamburger may be improved by employing a binder which prevents the crumbling of the meat in cooking and aids in the retention of water in the cooked meat. This helps to prevent shrinkage.

Ordinary cereal starch, when added to a ground or finely diced meat product, aids in the reduction of the water loss. We have found, however, that cereal starches low in amylopectin content will produce a product which has inferior properties. The water retention, texture, juiciness and taste are but little improved over those obtained when hamburger and other ground or diced meat is cooked without the added starch.

We have now discovered that by using an unmodified starch, which contains 50% or more of amylopectin, we may obtain a substantially greater improvement in water retention and in reduction of shrinkage of the hamburger in cooking.

Such starches are those which are unmodified, for example, ungelatinized starches which contain a large proportion of amylopectin. Suitable starches and flours containing such starches include those which are high in amylopectin, such as wheat starch, corn starch, sweet waxy rice starch, maize and milo starches. Such starches which contain more than 50% of amylopectin by weight, calculated on a volatile free (dry) basis, are termed amylopectin starches. (For methods of determining the percent amylopectin in starches and flours, see Chemistry & Industry of Starch by Ralph W. Kerr, 2nd edition, 1950, pages 676-678.) Such amylopectin starches in unmodified form are hereinafter referred to as unmodified amylopectin starches, and flours containing such starches are referred to as amylopectin flours. Such starches and flours, when used as a binder, result in a substantial improvement in water retention.

While starches as described above are usefully employed in the meat additive of our invention, we have found that superior results may be obtained by employing an unmodified waxy type starch containing more than 50% by weight of amylopectin.

An improvement is obtained in water retention and shrinkage reduction of cooked hamburger and other ground or diced meats by employing a chelating agent in the meat mixture. Such chelating agents will act to reduce the water loss and resultant shrinkage and give an improved texture. We may use any of the physiologically safe chelating agents which act as sequestering agents, for example, mono and dibasic sodium phosphates and polyphosphates, including sodium tripolyphosphate, sodium hexametaphosphate, sodium triphosphate, sodium metaphosphate, sodium pyrophosphate, sodium or potassium bicarbonate, sodium citrate, and other physiologically acceptable alkali metal salts, for example, the equivalent potassium salts, or mixtures thereof. Such chelating agents, when used in the composition of our invention, will produce substantial improvement in the reduction of water loss and shrinkage and give hamburger and improved organoleptic character, that is, a superior flavor, juiciness and texture.

Of the above chelating agents, we prefer to employ sodium tripolyphosphate. We have found that, of the sodium tripolyphosphates, the "low temperature rise sodium tripolyphosphates," known as LTR-STPP, are preferred, since they have a solubility in water which is much superior to the "high temperature rise tripolyphosphates" (HTR-STPP).

The common impurities found in commercial sodium tripolyphosphate are $Na_4P_2O_7$, $Na_3PO_4$, $(NaPO_3)_3$ and long chain phosphates, and these affect the temperature rise.

The preferred sodium tripolyphosphate (LTR) is one with about 6°-8° C. temperature rise, according to the ASTM Method D501-55T (June 1955).

The use of high amylopectin waxy starches, unmodified, together with a chelating agent produces a substantially greater improvement in water retention and in flavor, juiciness and texture than is obtained through the use of the starch alone or of the chelating agent alone. The organoleptic properties of the meat may also be improved by the addition of a proteolytic material, and this may be any one of the commonly used proteases, for example, the enzymes chymotrypsin, trypsin, cathepsin, pancreatin, pepsin, chymopepsin, bromelin, ficin, papain, and mold enzymes and enzymes of microbial origin.

The preferred protease is papain. A suitable activity is one equivalent o about 3.9 to about 7.8 mg. of tyrosine/100 mls. The activity is determined by matching the ultraviolet (U.V.) absorption of a solution formed by reacting 5 ml. of 1% casein in water substrate with 1 ml. of papain solution containing 0.1 mg. of the papain being tested, for 15 minutes at 40° C., and deactivated with 5 ml. of deproteinizing agent, with a test solution of tyrosine in 100 ml. of water. Thus, a suitable papain is one which will match the U.V. absorption of a tyrosine solution having a concentration in the range of from about 3.9 to about 7.8 mg. of tyrosine/100 ml.

The water-retention properties of hamburger, when employing the unmodified, for example the ungelatinized, amylopectin starch, alone; or the chelating agent, e.g., tripolyphosphate, alone; or the protease, e.g., papain, alone, are less than those obtained when two or three of them are combined. The presence of all three components together produces a lower water loss than is produced by any one of them or any two of them used alone, that is, in the absence of the other components.

The organoleptic properties of hamburger are improved and the water loss and shrinkage are diminished by using the combination of chelating agents, unmodified ungelatinized waxy type starch and a protease, in combination with each other. The preferred range of the ingredients is as follows.

The composition of our invention consists essentially of the following, in the following weight ratios:

Chelating agents—preferably sodium tripolyphosphate—from about 1 to about 7 parts.
Starch—preferably unmodified (ungelatinized), waxy, containing more than 50% by weight of amylopectin on a volatile free (dry) basis—from about 1 to about 7 parts.
Protease—preferably purified high activity papain (activity equivalent to from about 3.9 to about 7.8 mg. tyrosine/100 ml.)—from about 0.0004 to about 0.004 parts.

(A part being understood to be a weight unit such as grams, ounces, pounds or tons, and the same unit in each case.)

While the preferred embodiment employs all three of the above ingredients, the composition of our invention also includes compositions in which any one or any two are omitted, provided that either the sodium tripolyphosphate (or equivalent chelating agent) or the ungelatinized waxy starch is used. Thus, the protease and the starch or either of them may be omitted, if the chelating agent is used; or the protease and the chelating agent or either of them may be omitted, if the starch is used.

In addition to the above ingredients, we may add flavoring and coloring agents, as will be understood by those skilled in the cooking arts.

The following specific embodiment of the composition of our invention, and the mode which we now contemplate to be the best one for carrying out our invention, contains about an equal weight of the starch and the sodium tripolyphosphate, and about 0.04% to 0.06% by weight of papain, based on the total weight of the other two above ingredients for example, 0.05% based on the weight of the starch.

| Example I | Grams |
|---|---|
| Sodium tripolyphosphate (LTR—6°–8° C.—containing 56%–58% $P_2O_5$) | 4.54 |
| Ungelatinized unmodified waxy corn starch (containing from 8% to 12% moisture | 4.54 |
| Purified papain enzyme | 0.0023 |

The preferred sodium tripolyphosphate to be used in the above formulation is the LTR–STPP 56%–58% $P_2O_5$.

The preferred starch to be used in this composition is amioca corn starch containing about 100% amylopectin on a volatile free (dry) basis.

The papain activity to be preferred is one equivalent to about 5, e.g. 5.2, mg. tyrosine/100 ml.

To the above mixture may be added salt, sugar and/or food coloring. For example, about 3 to 5 grams of salt, 1 to 2 grams of sugar, and food coloring as desired may be added to taste and appearance.

The above dry mixture is sufficient to be mixed with one pound (454 grams) of uncooked hamburger meat. Water may also be added to the above mixture in the range of about 10 to about 120 ml., with the preferred range being from about 45 to about 75 ml. Obviously, in making the above mixture in larger quantities, as, for example, for bulk shipment or storage, the weights are all multiplied by a like factor.

The following examples illustrate the effect of varying the components of the above preferred mixture. The folowing is the most preferred mixture of ingredients and is hereinafter referred to as Example II mixture.

Example II

| Ingredients: | Grams |
|---|---|
| Salt (NaCl) | 3.5000 |
| Sucrose | 1.4400 |
| Papain | 0.0023 |
| Sodium tripolyphosphate | 4.5400 |
| Amioca starch [1] | 4.5400 |
| Food coloring matter | 0.2490 |

[1] Containing about 8%–12% moisture on a volatile free (dry) basis.

The total of 14,2713 grams is suitable for use with one pound of ground meat to form hamburger patties. The effect of varying the amount of the several ingredients is given below.

As shown in the following Table I, the weight of the sodium tripolyphosphate was varied as indicated, while the weights of all other ingredients were kept constant as given in the above Example II. The compositions were each mixed with one pound of hamburger and cooked all to the same degree of "doneness" by pan broiling the same in the same equipment for the same length of time and at the same temperature.

TABLE I

| Variable, LTR (56–58% $P_2O_5$) Sodium tripolyphosphate, gm. | Average Percent | | Organoleptic Evaluation | | |
|---|---|---|---|---|---|
| | Moisture loss | Shrinkage | Flavor | Juiciness | Texture |
| 2.27 | 22.7 | 32.5 | Lacks salt | Fair | Good. |
| 4.54 | 20.4 | 27.5 | Good | Good | Do. |
| 6.81 | 18.7 | 27.5 | Phosphate noticeable | do | Do. |
| 9.09 | 19.4 | 25.0 | do | do | Slightly rubbery. |

Keeping the weight of the ingredients constant as given in the above Example II, the weight of the amioca starch was varied as given in the following table, and when mixed with one pound of hamburger and fried to the same degree as in the previous table, the results were as follows:

TABLE II

| Variable-Amioca starch, gm. | Average Percent | | Organoleptic Evaluation | | |
|---|---|---|---|---|---|
| | Moisture loss | Shrinkage | Flavor | Juiciness | Texture |
| 2.27 | 20.7 | 29.0 | Good | Good | Slightly crumbly. |
| 4.54 | 20.0 | 30.0 | do | do | Good. |
| 6.81 | 18.3 | 31.0 | do | do | Slightly crumbly. |
| 9.08 | 18.2 | 30.0 | do | do | Gummy; falls apart. |

Keeping the weight of all the other ingredients constant, as given in the above Example II, the weight of the papain was varied as given in the following Table III. The composition was mixed with one pound of hamburger and cooked to the same degree as in the previous tables, with results as follows:

TABLE III

| Variable-Papain. Activity 5.2 tyrosine/100 ml. gms. | Average Percent | | Organoleptic Evaluation | | |
|---|---|---|---|---|---|
| | Moisture loss | Shrinkage | Flavor | Juiciness | Texture |
| .0012 | 19.8 | 30.0 | Slightly flat | Good | Good. |
| .0023 | 19.8 | 32.0 | Good | do | Do. |
| .0046 | 20.2 | 31.0 | do | do | Mushy. |
| .0069 | 20.5 | 30.0 | Fair | Fair | Very mushy. |

As will be seen from Table I, the increase of the tripolyphosphate up to 6.81 grams gave a substantial improvement in the reduction of water loss. A noticeable taste was imparted by the phosphate, but not enough to make the hamburger unpalatable. Higher concentrations of phosphate made some improvement in shrinkage, but the texture was slightly rubbery. We therefore conclude that about 7 grams is an economic upper limit in the above formulation.

The reduction of the concentration of the polyphosphate below 4.54 grams increased the moisture loss and indicated that an addition of common salt would be useful for taste purposes. The preferred range, as indicated by the above tables, is therefore from about 2 to about 6 grams, although from 1 to 7 grams is a useful range when used in the weight proportions given in the above range of variations, as indicated by the preceding three tables.

As shown in Table II, the increase of the starch up to about 7% made the cooked hamburger patties slightly crumbly but nevertheless acceptable. Increasing the concentration of the starch up to about 9.08 grams caused the hamburger to fall apart. The increase in the starch concentration up to 6.81 grams did improve the moisture loss, with a minor effect on shrinkage. The range of about 2 to about 6 grams is thus the preferred range, and the range of 1 to 7 grams is also a useful range when used in the ratios to the other ingredients as indicated by the above tables.

As will appear from Table III, the variation in the papain content had a small effect on the moisture loss and the shrinkage, but an increase in the papain up to 0.0046 gram resulted in a mushy product. The range of about 0.001 gram to about 0.003 gram is the preferred range, although the range of 0.0004 to about 0.004 gram is also a useful range.

The above ranges suitable for one pound of meat, given in grams, will also give the weight proportions of the ingredients one to the other to be employed in larger batches.

The effect of the presence of the ingredients (starch, sodium tripolyphosphate and protease) upon the organoleptic properties and water-retention properties of the hamburger patties is given in the following Tables IV, V and VI.

The synergistic effect of the ingredients in the formula of Example II will appear from the following Tables IV and V. The standards of comparison were broiled and fried hamburger prepared using the formula of Example II in the ratios to meat as specified. This was compared with hamburgers in which only salt is used and also with hamburgers made with the formula of Example II in which one of the ingredients, i.e., sodium tripolyphosphate, amioca starch or papain, was omitted, or a combination of two of these ingredients was omitted. Each comparison was made by cooking to the same doneness as in the case of the tests of Tables I to III.

TABLE IV.—PERCENT MOISTURE LOST AND PERCENT IMPROVEMENT OF GROUND BEEF PATTIES

| Ingredients | Percent moisture lost broiled patties | Percent improvement | Percent moisture lost fried patties | Percent improvement |
|---|---|---|---|---|
| Papain only—no phosphate or starch | 24.7 | 32.0 | 25.3 | |
| Example II | 16.8 | | 14.2 | 43.9 |
| Sodium tripolyphosphate—no starch or papain | 18.6 | 11.3 | 19.2 | |
| Example II | 16.5 | | 16.2 | 15.6 |
| Starch only—no phosphate or papain | 21.7 | 18.9 | 23.2 | |
| Example II | 17.6 | | 16.2 | 30.2 |
| Papain and sodium tripolyphosphate—no starch | 20.8 | 7.2 | 19.2 | |
| Example II | 19.3 | | 17.3 | 9.9 |
| Papain and starch—no phosphate | 23.4 | 32.9 | 22.2 | |
| Example II | 15.7 | | 17.3 | 22.1 |
| Sodium tripolyphosphate and starch—no papain | 19.0 | 3.2 | 15.5 | |
| Example II | 18.4 | | 14.2 | 8.4 |
| Salt only | | | 22.8 | |
| Example II | | | 14.0 | 38.6 |

TABLE V.—PERCENT SHRINKAGE AND PERCENT IMPROVEMENT OF FRIED GROUND BEEF PATTIES

| Ingredients | Percent Shrinkage | Percent Improvement of Example II over test |
|---|---|---|
| Papain—no phosphate or starch | 20.7 | |
| Example II | 12.6 | 29.1 |
| Sodium tripolyphosphate—no starch or papain | 17.2 | |
| Example II | 11.11 | 35.5 |
| Starch—no papain or phosphate | 22.7 | |
| Example II | 11.1 | 51.1 |
| Papain and sodium tripolyphosphate—no starch | 18.2 | |
| Example II | 11.6 | 36.3 |
| Papain and starch—no phosphate | 20.7 | |
| Example II | 11.62 | 44.0 |
| Sodium tripolyphosphate and starch—no papain | 15.2 | |
| Example II | 12.6 | 17.1 |
| Salt only | 20.7 | |
| Example II | 11.6 | 44.0 |

It will be observed that in no case does the omission of any one of the ingredients, sodium tripolyphosphate, amioca strach, or papain, give results that are as good as obtained by using all three. In the case of water loss in fried and broiled hamburgers, the omission of papain (the sodium tripolyphosphate and amioca starch being present) has an effect on water retention and shrinkage which is substantially less than that caused by the omission of either sodium tripolyphosphate or amioca starch, the other two ingredients being present. The use of sodium tripolyphosphate, amioca starch or papain alone (the other two ingredients being absent) gives inferior results. The absence of all three ingredients increases the water loss substantially. See the results with the hambuger using only salt.

The effect on shringage of all three ingredients, as compared to the use of any two of the ingredients or the entire absence of all of the ingredients, is even more marked. The starch and papain, when used alone or used conjointly, show a smaller improvement of the shrinkage.

The closest match to the results obtained with the use of the composition of Example II is that in which the papain alone was omitted. The comparative decrease in water loss by using Example II was 8.4%. The improvement in shrinkage by using all three ingredients as compared to using papain and tripolyphosphate, omitting starch, was 36.3%, and in water loss it was 9.9%. The improvement in shrinkage obtained by using all three components compared to using starch and papain alone was 44%, and in water loss it was 22.1%.

The improved result obtained by employing ungelatinized starches having more than 50% of amylopectin on a volatile free (dry) basis, compared with using the same starch which has been gelatinized, is illustrated in the results obtained by substituting for the ungelatinized amioca starch of Example II an equal quantity of the same starch which has been previously gelatinized.

The above quantities of additive and cooking control as previously stated were employed.

TABLE VI

| Type of starch | Percent weight loss of patties | Remarks |
|---|---|---|
| Ungelatinized starch | 20.4 | Very good texture. |
| Gelatinized starch | 24.8 | Falls apart and gummy. |

The following Table VII gives the Hedonic Organoleptic Panel Test Ratings of hamburgers prepared employing the compositon of Example II compared with plain hamburger to which the composition was not added.

TABLE VII.—PANEL TEST RATED SEPARATELY FOR FLAVOR, JUICINESS AND APPEARANCE
[Number of Panelists, 16]

| Type of test | Example II, percent | Control, percent | No preference, percent |
|---|---|---|---|
| Flavor | 62.5 | 25.0 | 12.5 |
| Juiciness | 81.25 | 12.5 | 6.25 |
| Appearance | 81.25 | | 18.75 |

(Percentages indicate percent of panelists stating the indicated preferences.)

The relative effect of a starch having more than 50% of amylopectin as compared to those having less than 50% of amylopectin is shown by the following test data.

Ground meat was cooked as described in the previous tests, employing the formulation of Example II. The starch employed in Example II was replaced by an equal weight quantity of wheat starch containing 10% moisture and 27% amylose, i.e., 30% amylose and 70% amylopectin by weight, on a volatile free basis, and in another test by corn starch containing 70% amylose and 12% moisture and a minor quantity of amylopectin, less than about 30% of amylopectin by weight, i.e., 34% on a volatile free basis.

The standard against which the hamburgers using the above additive were compared was the hamburgers to which salt only was added, as in the above tests.

The results are given in the following Table VIII.

TABLE VIII

| | Test No. 1 | | | Test No. 2 | | |
|---|---|---|---|---|---|---|
| Formulations | Amioca—100% amylopectin, no amylose | Wheat starch approx. 27%, amylose | Control salt only | Amioca—100% amylopectin | Corn starch approx. 70% amylose | Control salt only |
| Average percent moisture lost [1] | 20.5 | 20.4 | 26.2 | 19.6 | 22.3 | 25.7 |
| Organoleptic evaluation (Rank preference tests) [2], juiciness: | | | | | | |
| 1st preference | 48.4 | 20.7 | | 52.5 | 8.7 | |
| No preference | 30.9 | 30.9 | | 39.1 | 39.1 | |

[1] Average percent moisture lost was based on the weight of 8 to 12 patties.
[2] Organoleptic evaluation was based on 23 to 29 separate evaluations.

It will be seen in the above test that when the wheat and amioca starch are employed they each produce substantially the same water retention effect. The low amylopectin starch was markedly inferior in this respect.

The organoleptic evaluation of the hamburgers containing the amioca starch gave markedly higher preference rating than when the wheat starch having a lower content of amylopectin was employed. Thus, the hamburgers with the additive containing the amioca starch were preferred about 2.5:1, as compared with the wheat starch.

The results when the additive contained amioca starch, compared with the additive containing the starch with 70% amylose, show a marked superiority for the amioca starch. Thus, the hamburgers containing the additive with amioca starch were preferred about 6:1 as compared to the additive containing the starch with 70% amylose.

It is to be understood that, in place of the above starches, we may employ flours containing these starches; and in the claims, where starches are referred to, the flours containing these starches are to be included, in amounts substantially equivalent to include the starches in the claimed amounts.

While we have described a particular embodiment of our invention for the purpose of illustration, it should be understood that various modifications and adaptations thereof may be made within the spirit of the invention, as set forth in the appended claims.

We claim:

1. A meat additive consisting essentially of 1 to 7 parts of a physiologically safe chelating agent, 1 to 7 parts of an unmodified starch containing more than 50% amylopectin on a volatile free basis, and 0.0004 to about 0.004 part of a protease, said protease having an activity equivalent to an activity within the range of from about 3.9 to about 7.8 mg. of tyrosine/100 ml.

2. The meat additive of claim 1 wherein the chelating agent is low temperature rise sodium tripolyphosphate.

3. The meat additive of claim 1 wherein the starch is amioca starch.

4. The meat additive of claim 1 wherein the protease is papain.

5. The meat additive of claim 1 wherein the chelating agent is low temperature rise sodium tripolyphosphate, the starch is amioca starch, and the protease is papain.

(References on following page)

References Cited

UNITED STATES PATENTS

| | | | |
|---|---|---|---|
| 2,884,346 | 4/1959 | Korth | 127—71 X |
| 3,154,421 | 10/1964 | Voegeli et al. | 99—159 |
| 3,188,213 | 6/1965 | Delaney | 99—107 |
| 3,216,827 | 11/1965 | Fetty | 99—109 X |
| 3,268,337 | 8/1966 | Howard et al. | 99—92 |

FOREIGN PATENTS

| | | |
|---|---|---|
| 516,917 | 1/1940 | Great Britain. |

HYMAN LORD, Primary Examiner